United States Patent [19]

Homier

[11] 4,103,970
[45] Aug. 1, 1978

[54] SEAT RECLINER
[75] Inventor: Robert I. Homier, Shelby, Ohio
[73] Assignee: Lear Siegler, Inc., Morristown, Tenn.
[21] Appl. No.: 758,898
[22] Filed: Jan. 13, 1977
[51] Int. Cl.² ............................................. B60N 1/02
[52] U.S. Cl. .................................... 297/363; 297/367; 297/379
[58] Field of Search ............... 297/367, 366, 363, 364, 297/365, 379

[56] References Cited
U.S. PATENT DOCUMENTS
3,737,946  6/1973  Giuliani ............................... 297/367

FOREIGN PATENT DOCUMENTS
1,296,060  5/1962  France ..................................... 297/367
2,364,755  8/1974  Fed. Rep. of Germany ........... 297/367

Primary Examiner—Francis K. Zugel
Attorney, Agent, or Firm—Reising, Ethington, Barnard, Perry & Brooks

[57] ABSTRACT

A seat recliner having seat back and cushion arms connected to each other about a pivotal axis for adjustable movement. Plate-like ends of the arms are located adjacent each other with a locking ring therebetween pivotally fixed to the seat back arm end encircling the pivotal axis. Locking teeth of the ring extend inwardly and are arranged in an arcuate shape about the pivotal axis. A locking dog is received within the locking ring between the ends of the arms and has a plate-like construction slidably supported between the arm ends. Spaced guides on the seat cushion arm end guide the dog during movement between locking and nonlocking positions. A toothed end of the dog engages the locking ring teeth in the locking position to prevent relative pivoting between the arms and disengages the ring teeth in the nonlocking position to permit such pivoting for adjustment of the arms. A cam is received within an opening of the dog and is movable about the pivotal axis to move the dog between the locking and nonlocking positions. A manual actuator pivots the cam in one direction to slidably engage a cam surface with a locking surface of the dog opening to move the dog to the locking position and position the cam in an overcenter relationship with the dog so as to maintain the dog in the locking position with a detenting action. Manual pivoting of the cam in the opposite direction initially moves the cam out of its overcenter relationship and subsequently engages the cam surface with an unlocking surface of the dog opening to move the dog to the nonlocking position. Preferably, the seat cushion arm has two pairs of spaced guides, one of which slidably guides the toothed end of the dog, and the other of which slidably guides a second end of the dog on the opposite side of the pivotal axis from the toothed end. A shaft is fixed to one of the arm ends and pivotally supports the other arm end as well as pivotally supporting the cam that moves the dog. A counterbalance spring extends between the shaft and the arm pivotally supported relative to the shaft to provide a forward biasing of the seat back arm.

10 Claims, 11 Drawing Figures

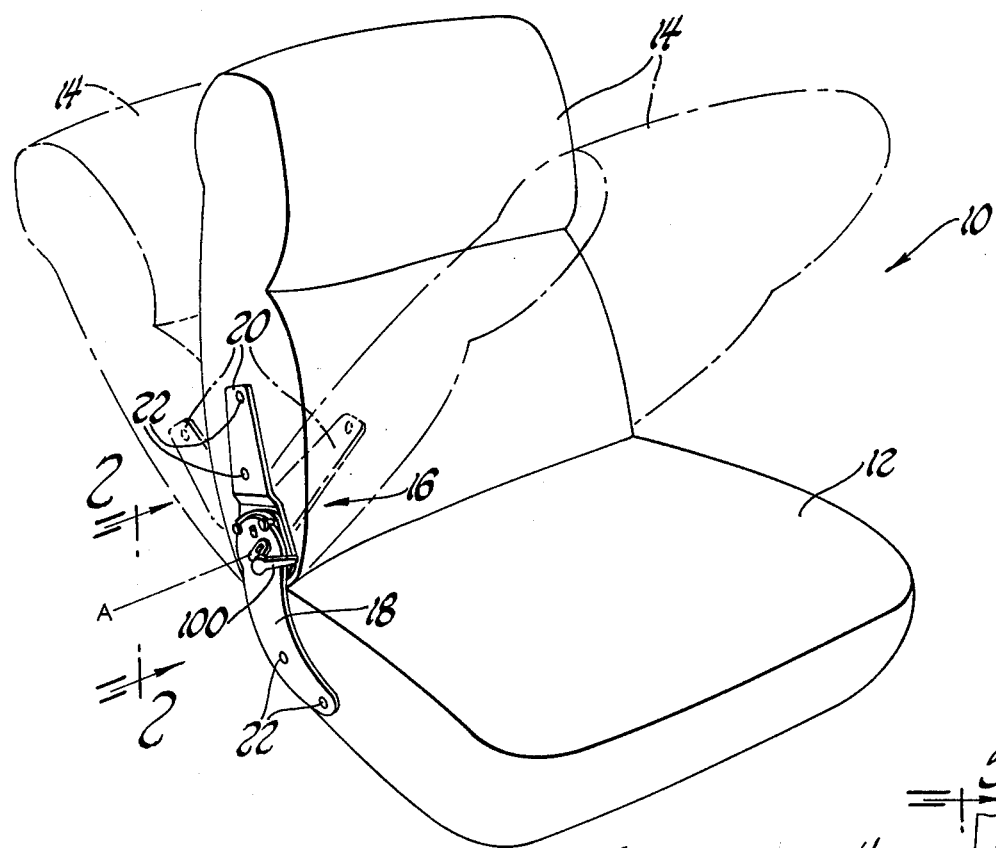
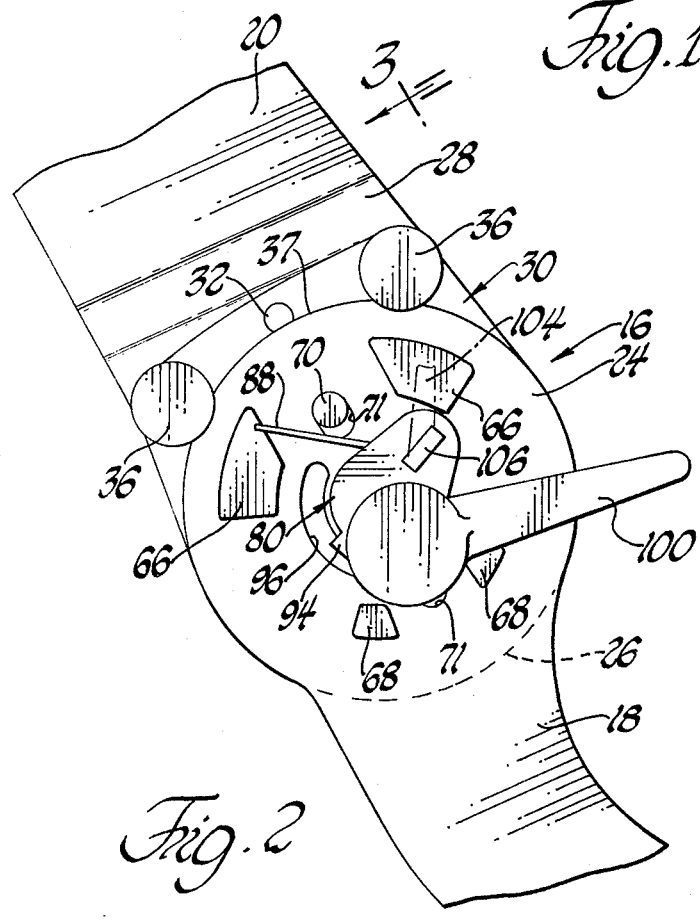
Fig. 1
Fig. 2
Fig. 3

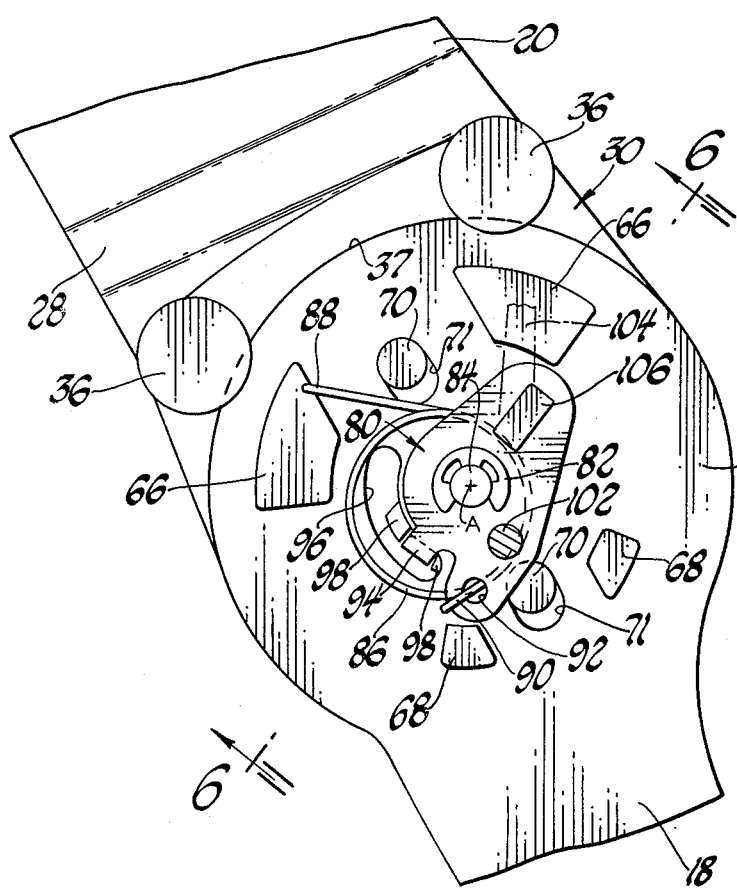
Fig. 4
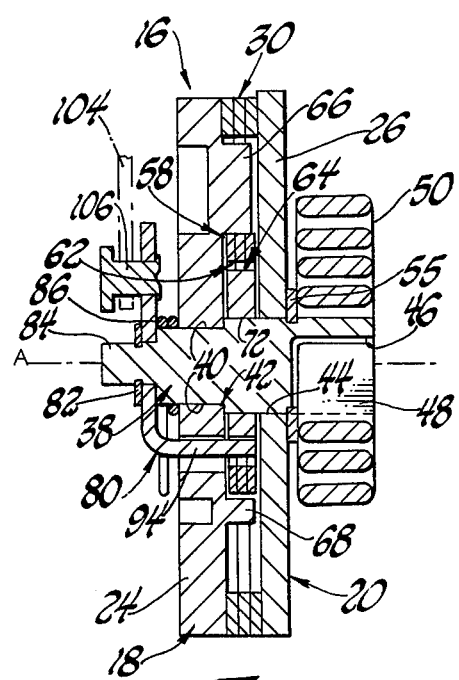
Fig. 5A
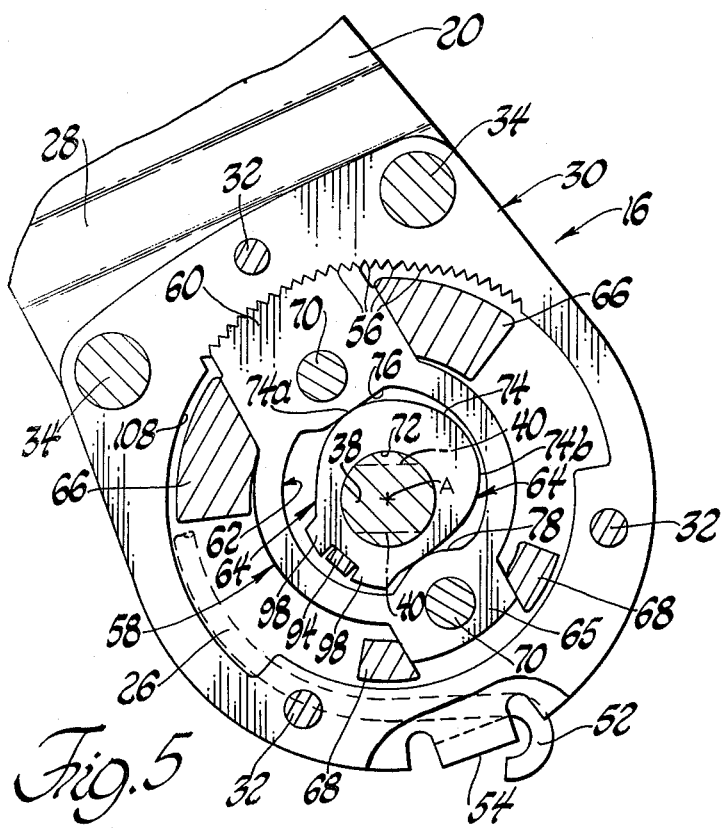
Fig. 5
Fig. 6

SEAT RECLINER

BACKGROUND OF THE INVENTION

1. Field of the Invention

The present invention relates to seat recliners for adjusting the angular position of seat backs relative to associated seat cushions to provide seat occupants with the desired seat back inclination.

2. Description of the Prior Art

Seat recliners have been utilized heretofore to adjust the angular position of a seat back relative to an associated seat cushion to provide the seat occupant with the desired seat back inclination for comfortable seating. One application where these recliners have been used extensively is in vehicle seats, particularly those of the front seat automotive type. One requirement of such seat recliners is that the angular position of the seat back be adjustable relative to the seat cushion for somewhere between approximately 30° and 45° of adjustment. Also, when the recliners are utilized with the front seats of a two door type vehicle body, the seat back must also be pivotally movable to a forward easy-enter position so passengers can enter or leave the rear seat behind the front seat. When utilized with vehicles, the seat recliners must be sufficiently durable to withstand continued use for many years without being too expensive to prevent commercial acceptance of the recliners by vehicle manufacturers. Also, the recliners must be relatively compact so they can be easily packaged with automotive seats.

Seat recliners are shown by the following patents: U.S. Pat. Nos. 2,311,105; 3,309,139; 3,511,534; 3,737,946; and 3,788,698; and French Pat. No. 1,296,060.

SUMMARY OF THE INVENTION

An object of the present invention is to provide an improved seat recliner having a construction which is durable in use, relatively inexpensive to manufacture, and compact so as to be easily packaged for use with seats, particularly those of the vehicle type.

Another object of the invention is to provide an improved seat recliner including seat back and cushion arms with pivotally interconnected plate-like ends having a locking ring positioned therebetween fixed to one of the arm ends and a slidable dog of a plate-like construction guided on the other arm end and moved by an actuating cam that pivots into an overcenter relationship with the dog to maintain a toothed end thereof in a locking relationship with locking teeth of the ring in order to selectively prevent pivoting between the arms.

In carrying out the above objects as well as other objects of the invention, a preferred embodiment of the seat back recliner has the locking ring fixed to the plate-like end of the seat back arm and has spaced guides on the plate-like end of the seat cushion arm. On the opposite side of the pivotal axis from the toothed dog end, a second end of the dog is slidably supported by spaced guides on the seat cushion arm end in the same manner as the toothed end of the dog. Between the ends of the dog, an opening in the dog receives the cam that controls the dog movement. The dog opening has a locking surface with which the cam moves into the overcenter relationship to maintain the dog in its locking position engaging the locking teeth of the ring. Pivoting of the cam in the opposite direction to that which moves the dog to the locking position initially moves the cam out of its overcenter relationship and then subsequently engages the cam surface with an unlocking surface of the dog opening to move the dog so that its toothed end disengages the ring teeth and thereby allows pivotal adjustment of the recliner arms.

A shaft is fixed to one of the arm ends and pivotally supports the other arm end along the pivotal axis. Counterbalancing of the seat back arm is provided by a counterbalance spring that extends between the shaft and the arm pivotally supported thereby so as to bias the seat back arm in a forward direction. An opening in the actuating cam receives the shaft as it extends through the dog opening between the plate-like arm ends so as to provide pivotal support for the cam.

Maintaining the dog in the locking position by the overcenter action of the cam provides positive positioning of the seat back arm in any adjusted position to which it is located. Similarly, locating the cam within the dog opening and positioning the dog and the cam between the plate-like ends of the seat cushion and seat back arms provides a compact recliner readily adaptable for use in the vehicle seating environment.

The objects, features and advantages of the present invention are readily apparent from the following detailed description of the preferred embodiment taken in connection with the accompanying drawings.

BRIEF DESCRIPTION OF THE DRAWINGS

FIG. 1 is a perspective view of a vehicle seat incorporating a seat recliner constructed according to the present invention;

FIG. 2 is an enlarged side elevation view of the seat recliner taken along line 2—2 of FIG. 1;

FIG. 3 is an end view of the recliner taken along line 3—3 of FIG. 2;

FIG. 4 is an enlarged view partially in section of the recliner taken approximately along line 4—4 of FIG. 3;

FIG. 5 is an enlarged sectional view of the recliner taken approximately along line 5—5 of FIG. 3;

FIG. 5A is a view of a portion of FIG. 5;

FIG. 6 is a sectional view through the recliner taken along line 6—6 of FIG. 4.

DETAILED DESCRIPTION OF THE PREFERRED EMBODIMENT

Figure 7A:
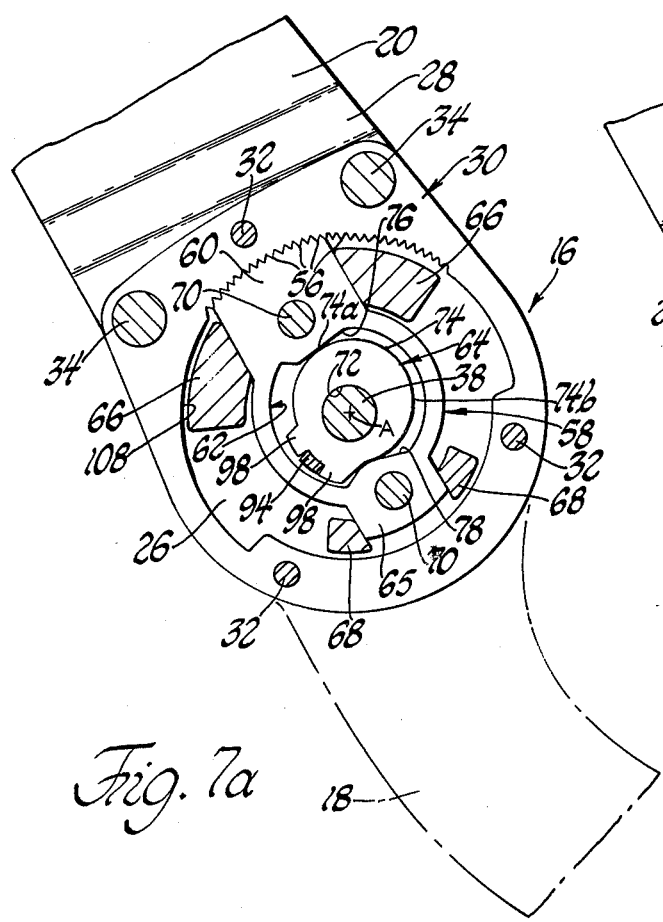
FIGS. 7a, 7b, 7c and 7d are views taken in a direction similar to FIG. 5, FIG. 7a showing the recliner locked in its forwardmost seating position, FIG. 7b showing the recliner in the forwardmost seating position but unlocked, FIG. 7c showing the recliner locked in a fully reclined position, and FIG. 7d showing the recliner tipped forwardly to an easy-enter position.

Referring to FIG. 1 of the drawings, a vehicle seat collectively indicated by 10 includes a generally horizontal seat cushion 12 and a vertically extending seat back 14 that have unshown frames for pivotally supporting the seat back about an axis A. Seat back 14 is movable from the vertical seating position shown by solid lines to a forwardly tipped easy-enter position and a rearwardly inclined position as shown by phantom lines. A seat recliner 16 constructed according to the present invention controls the pivotal movement of the seat back 14 with respect to the seat cushion 12 and includes seat cushion and seat back arms 18 and 20, respectively, secured to the associated seat component frames by suitable headed pins 22.

With additional reference to FIGS. 2 and 3, recliner arms 18 and 20 include respective plate-like ends 24 and 26 that are arranged in an opposed parallel relationship adjacent each other. Adjacent its end 26, the seat back arm 20 includes an offset 28 so that the planes of both arms are generally coincident with each other. A plate-like locking ring 30 is located between the arm ends 24 and 26 in a sandwiched relationship and is fixed to the seat back arm end 26 by small diameter pins 32 (see also FIG. 5) and by larger diameter pins 34 that have heads 36 for slidably engaging the round peripheral edge portion 37 of the seat cushion arm end 24 as the seat back arm pivots about axis A.

A shaft 38 of recliner 16 is shown in FIG. 6 as extending along the pivotal axis A between the plate-like arm ends 24 and 26. Shaft 38 includes a portion with radial flats 40 that are received within a complementary opening 42 in the seat cushion arm end 24 so as to be pivotally fixed relative to the seat cushion arm. A round opening 44 in the seat back arm end 26 rotatably receives the shaft 38 so that the seat back arm is pivotally supported by the shaft for movement about axis A. At its FIG. 6 righ-hand end, shaft 38 includes a slot 46 that receives the inner end 48 of a spiralling clock-type spring 50. As shown in FIG. 5, the outer end 52 of this spring is hooked over a flange 54 of the seat back arm end 26 such that the bias of the spring provides a forward counterbalancing of the seat back while located in rearwardly inclined positions. A split-type washer 55 (FIG. 6) is received within an annular groove in shaft 38 between spring 50 and seat back arm end 26. Washer 55 prevents axial movement of arm end 26 outwardly along shaft 38 and thereby maintains this arm on the shaft.

As seen in FIG. 5, locking ring 30 includes inwardly extending locking teeth 56 arranged in an arcuate shape about the pivotal axis A. A plate-like locking dog 58 of the recliner has a toothed end 60 that is cooperable with the locking ring teeth 56 to selectively prevent pivotal movement between the seat cushion and seat back arms 18 and 20 as is more fully hereinafter described. In order to facilitate the stamping of the ring teeth 56 and the toothed dog end 60, the locking ring 30 and the dog 58 are made with laminate structures as shown in FIG. 6 from three different laminations. However, it is also possible to make each of these components with an integral construction. Nevertheless, the dog 58 must have a slightly lesser thickness than the ring 30 so that it is slidably supported between the seat cushion and seat back arm ends 24 and 26 for movement that positions its toothed end 60 in and out of engagement with the ring teeth 56. An opening 62 in dog 58 receives an actuating cam 64 that moves the dog during pivotal cam movement about axis A. On the opposite side of pivotal axis A from its toothed end 60, dog 58 includes a second end 65. A pair of spaced guides 66 on seat cushion arm end 24 slidably support the toothed dog end 60 for movement toward and away from the locking teeth 56 while a second pair of spaced guides 68 on arm end 24 slidably support the second dog end 65. Guides 66 and 68 are preferably made by partial piercing the arm end 24 as best seen in FIG. 6. Pins or partial pierces 70 at the dog ends 60 and 65 locate the laminations thereof and, as seen in FIG. 4, are received within respective slots 71 in the seat cushion arm end 24 in a guided manner.

Actuating cam 64, as seen in FIGS. 5 and 6, is received within the dog opening 62 and has a round opening 72 that rotatably receives the shaft 38 so that the cam is rotatable about axis A. An outer cam surface 74 of cam 64 is engagable with both a locking surface 76 of the dog opening and an unlocking surface 78 of this opening. Pivotal movement of cam 64 about shaft 38 is accomplished by an actuator 80 best seen in FIGS. 4 and 6. A clip 82 pivotally secures the actuator on a reduced diameter portion 84 of shaft 38 so that the actuator pivots about axis A. A relatively light bias spring 86 encircles the shaft 38 about axis A as shown in FIG. 4 and has one end 88 hooked to the seat cushion arm end 24 and another end 90 inserted through an aperture 92 in actuator 80. The bias of spring 86 urges the actuator 80 in a counterclockwise direction about the axis A. A projection 94 of actuator 80 extends inwardly through an arcuate slot 96 of the seat cushion arm end 24 and is received between spaced lugs 98 on the cam 64 such that the cam pivots in response to pivoting of the actuator.

As seen by combined reference to FIGS. 2-4, a manually actuated knob 100 secured to a pin 102 on actuator 80 and a remote release 104 connected to a squared projection 106 on the actuator may be used to pivot the actuator 80. With the cam 64 located in the position of FIG. 5 and FIG. 5A, dog 58 is in a locking position with its toothed end 60 engaging the ring teeth 56 and thereby preventing pivotal movement between the seat back and cushion arms 18 and 20. In the locking position, a lobe 74a of cam surface 74 is located in an overcenter relationship with the dog to the left of a centerline between the dog end pins 70 through axis A. Consequently, forces acting on the seat back arm 20 tending to move the dog away from its locking position with the toothed engagement shown tend to rotate the cam 64 counterclockwise further into the locking position and the dog is thus detented against movement out of the locking position. When unlocking of the recliner is desired for adjustment, the cam 64 is pivoted clockwise by the actuator 80 so that cam surface lobe 74a first moves to the right of the centerline between the cam end pins 70 and then causes a cam surface lobe 74b to actuate the unlocking dog surface 78 and slide the dog 58 to a nonlocking position where its toothed end 60 is out of engagement with the ring teeth 56. When this disengagement takes place, the seat back arm 20 is pivotally adjustable relative to the seat back arm 18. Subsequently, the bias of spring 86 moves the actuator 80 and cam 64 so that the dog 58 is moved thereby to the locking position while the cam moves into the overcenter relationship that detents the dog in position.

Figure 7B:
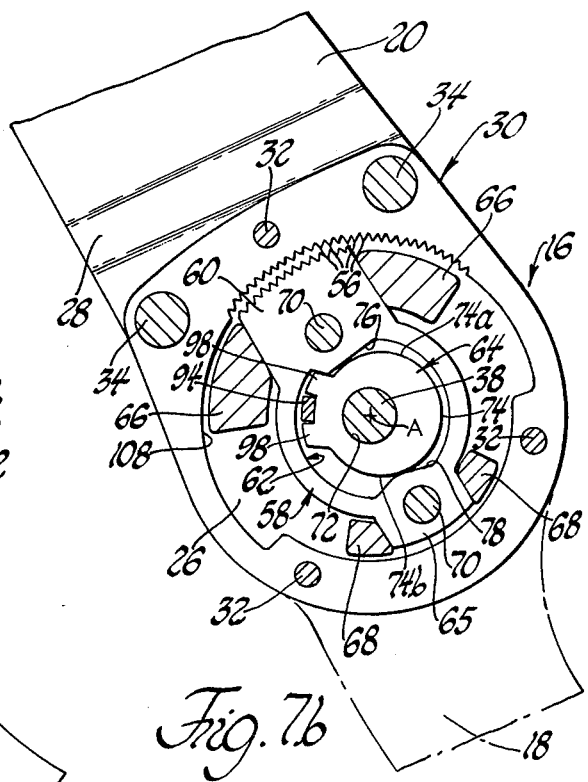
Figure 7C:
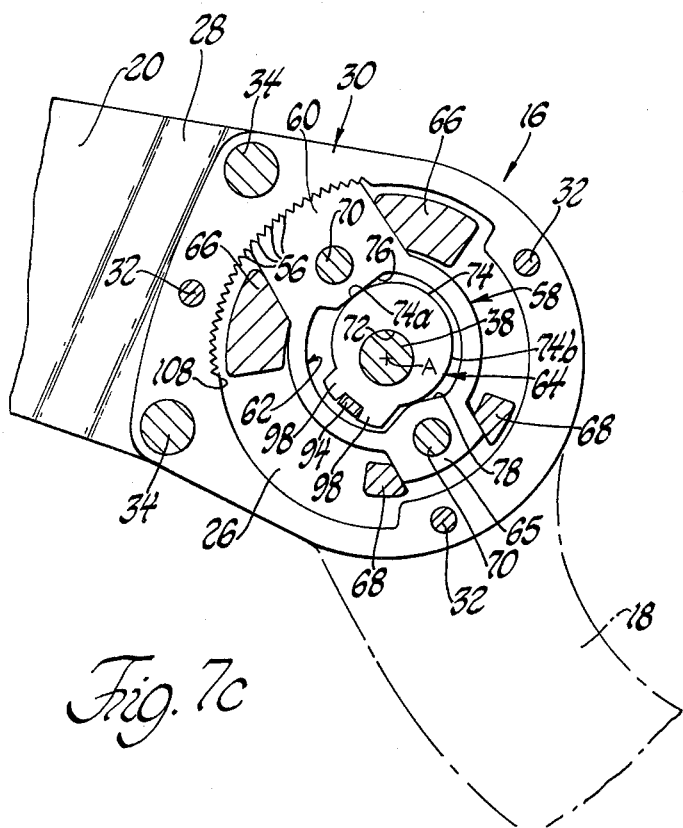
Figure 7D:
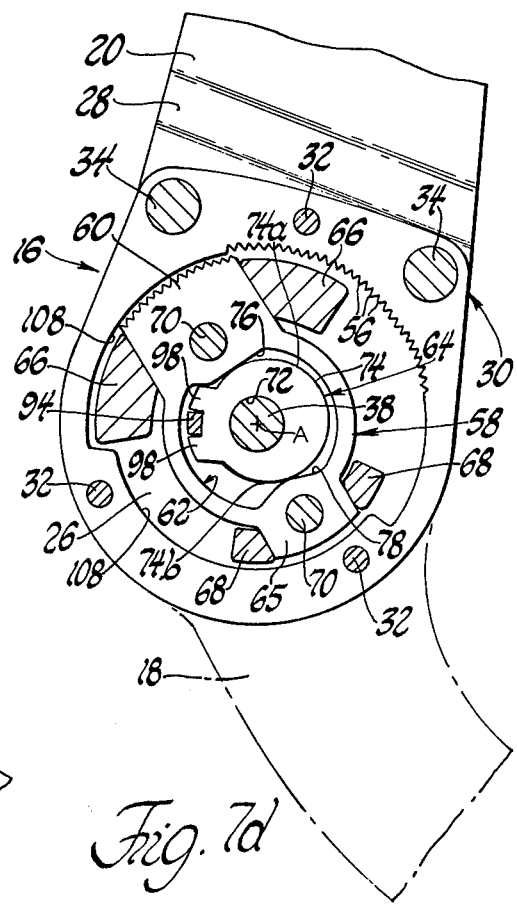

With the recliner 16 positioned as shown in FIG. 7a, the locking dog 58 positions the seat back arm 20 in a full forward position with the cooperable overcenter locking action provided by dog 58 and cam 64 in the manner previously described. Counterclockwise rotation of cam 64 unlocks the dog 58 as shown in FIG. 7b and then allows the seat back arm 20 to be pivoted relative to the seat cushion arm 18. For example, the seat back arm 20 may be pivoted to a fully reclined position as shown in FIG. 7c and then locked by subsequent counterclockwise rotation of cam 64. On the other hand, the seat back arm 20 may also be pivoted forwardly to the easy-enter position of FIG. 7d from the unlocked condition of FIG. 7b so as to permit convenient access to a rear seat. As long as actuator 80 is positioned against the bias of spring 86 (FIG. 4) by either the knob 100 or the remote release 104 (FIG. 2), the cam 64 will position the dog with its toothed end 60 out of engagement with the ring surface 108 on the counterclockwise side of teeth 56 while the seat back is tipped forwardly and rearwardly to and from the easy-enter position. During rearward pivoting of the seat back from the easy-enter position of FIG. 7d and release of the actuator 80 causes the cam 64 to again engage toothed dog end 60 and the ring teeth 56 at a selected position and thereby position the seat back arm 20 in a selected location.

While a preferred embodiment of the recliner has herein been illustrated in detail, those skilled in the art will recognize various alternative designs and embodiments for practicing the present invention as defined by the following claims.

What is claimed is:

1. A seat recliner comprising: seat back and cushion arms having plate-like ends connected to each other for relative movement about a pivotal axis; a locking ring positioned between the ends of the arms encircling the pivotal axis and fixed to one of the arms; the locking ring having an opening therethrough and including inwardly extending locking teeth located within the opening in an arcuate shape about the pivotal axis; the other arm having spaced guides located within the opening of the locking ring; a locking dog received within the opening of the locking ring between the ends of the arms and having a plate-like construction that is slidably supported between the arm ends; the dog having a toothed end slidably supported between the spaced guides on the other arm for movement relative thereto toward and away from the ring teeth and also having an opening through which the pivotal axis extends; a cam received within the opening of the dog and movable about the pivotal axis to slidably move the dog; the cam being pivotal in one direction to slidably move the dog to a locking position where the toothed end thereof engages the ring teeth to prevent relative pivoting between the arms; the cam being pivotal in the opposite direction to slidably move the dog to a nonlocking position where the toothed end thereof is disengaged from the ring teeth and thereby allows pivotal adjusting movement between the arms; the opening of the dog including a locking surface located toward the toothed dog end from the pivotal axis and an unlocking surface located on the opposite side of the pivotal axis from the locking surface; the cam including a surface having a lobe that slidably engages the dog locking surface during the pivotal cam movement in the one direction to move the cam lobe into an overcenter relationship with the dog locking surface and the pivotal axis so as to maintain the dog in the locking position; the cam surface slidably engaging the unlocking surface during pivotal cam movement in the opposite direction to move the dog to the nonlocking position; and actuator means for pivoting the cam in opposite directions to move the dog between the locking and nonlocking positions.

2. A recliner as claimed in claim 1 wherein the dog includes a second end on the opposite side of the pivotal axis from the first end, and spaced guides on the other arm for slidably supporting the second end of the dog.

3. A recliner as claimed in claim 2 further including a shaft fixed on a first arm and pivotally supporting the opposite arm relative thereto along the pivotal axis, a counterbalance spring extending between the shaft and the arm pivotally supported thereby so as to bias the seat back arm in a forward direction, and an opening in the cam that receives the shaft to support the cam for movement in opposite directions.

4. A seat recliner comprising: seat back and cushion arms connected to each other for movement about a pivotal axis; locking teeth on one of the arms arranged in an arcuate shape about the pivotal axis; a dog mounted on the other arm for movement relative thereto between locking and nonlocking positions; the dog having an opening therethrough and a toothed end that engages the locking teeth on the one arm in the locking position to prevent relative pivoting between the arms; the toothed dog end being disengaged with the teeth on the one arm in the nonlocking position of the dog to allow pivotal adjusting movement of the arms; a cam received within the dog opening and pivotal about the pivotal axis to move the dog between the locking and nonlocking positions; the opening of the dog including a locking surface located toward the toothed dog end from the pivotal axis and an unlocking surface located on the opposite side of the pivotal axis from the locking surface; and the cam including a surface having a lobe that slidably engages the dog locking surface during pivotal cam movement in the one direction to move the cam lobe into an overcenter relationship with the dog locking surface and the pivotal axis so as to maintain the dog in the locking position, the cam surface slidably engaging the unlocking surface during pivotal cam movement in the opposite direction to move the dog to the nonlocking position.

5. A recliner as claimed in claim 4 further including a shaft that connects the arms along the pivotal axis and extends through the dog opening, and the cam including an opening that receives the shaft so the cam is pivotally supported thereby for movement in opposite directions to move the dog between the locking and nonlocking positions.

6. A recliner as claimed in claim 5 wherein the arms have plate-like ends that are pivotally connected by the shaft, a locking ring fixed to the one arm and including the locking teeth, the dog having a plate-like construction slidably supported between the arm ends, and spaced guides on the other arm for slidably guiding the toothed dog end.

7. A recliner as claimed in claim 6 wherein the dog includes a second end on the opposite side of the pivotal axis from the toothed dog end, and spaced guides on the other arm for slidably supporting the second dog end.

8. A recliner as claimed in claim 5 including means pivotally fixing the shaft to a first arm while the opposite arm pivots thereon, and a counterbalance spring extending between the shaft and said opposite arm to bias the seat back arm in a forward direction.

9. A seat recliner comprising: seat back and cushion arms having plate-like ends; a shaft connecting the arm ends for movement about a pivotal axis; a locking ring positioned between the arm ends fixed to the seat back arm and encircling the pivotal axis; the locking ring having an opening therethrough and including inwardly extending locking teeth arranged within the opening in an arcuate shape about the pivotal axis; one of the arm ends including first and second pairs of spaced guides located on opposite sides of the pivotal axis within the opening of the locking ring; a locking dog of a plate-like construction slidably supported between the arm ends within the opening of the locking ring; the dog having a first toothed end slidably supported between the arm ends by one pair of spaced guides on said one arm end and a second end slidably supported by the other pair of spaced guides on said one arm end; the dog having an opening through which the shaft extends and the opening including a locking surface adjacent the toothed dog end and an unlocking surface adjacent the second dog end; a cam received within the dog opening and having an opening that receives the shaft to support the cam for pivotal movement in opposite directions; the cam having a surface that slidably engages the dog surfaces to move the dog between a locking position where the toothed dog end engages the locking teeth of the ring to prevent relative pivoting between the arms and a nonlocking position where the toothed dog end is disengaged with the locking teeth of the ring to allow pivotal movement between the arms; the cam surface having a lobe that slidably engages the locking dog surface during pivotal cam movement in one direction to move the dog to the locking position and concomitantly moving the cam lobe into an overcenter relationship with the dog locking surface and the pivotal axis to maintain the dog in the locking position; the cam surface slidably engaging the unlocking dog surface during pivotal cam movement in the opposite direction to move the dog to the nonlocking position; and actuating means for pivoting the cam in opposite directions.

10. A recliner as in claim 9 further including means pivotally fixing the shaft to one of the arms, and a counterbalance spring extending between the shaft and the other arm to bias the seat back arm forwardly.

* * * * *